United States Patent [19]

Bigelow

[11] Patent Number: 5,233,781
[45] Date of Patent: Aug. 10, 1993

[54] VALVED BALLOON FISHING SYSTEM

[76] Inventor: Jack R. Bigelow, P.O. Box 392, Cape Canaveral, Fla. 32920

[21] Appl. No.: 904,710

[22] Filed: Jun. 26, 1992

[51] Int. Cl.$^5$ ............................................. A01K 93/00
[52] U.S. Cl. ................................................. 43/17; 43/4
[58] Field of Search ............... 43/43.11, 17, 43.1, 43/4, 4.5, 43.12, 43.13

[56] References Cited

U.S. PATENT DOCUMENTS

| | | | |
|---|---|---|---|
| 980,667 | 1/1911 | Owen | 43/17 |
| 2,677,208 | 5/1954 | Newton | 43/43.11 |
| 2,958,976 | 11/1960 | Adams | 43/43.12 |
| 3,149,435 | 9/1964 | Nordeen | 43/43.11 |
| 4,648,194 | 3/1987 | Carroll | 43/4.5 |

Primary Examiner—Kurt C. Rowan
Attorney, Agent, or Firm—Paul S. Rooy

[57] ABSTRACT

A valved balloon fishing system comprising a balloon, valve attached to the balloon, hook line attached to the valve, rod line attached to the valve, hook attached to the end of the hook line opposite the valve, and fishing rod and reel attached to the end of the rod line opposite the valve, whereby wind blows the balloon offshore and the balloon is deflated when a fish takes the hook, thereby giving a clear visual signal that a fish is ready to be reeled in.

14 Claims, 5 Drawing Sheets

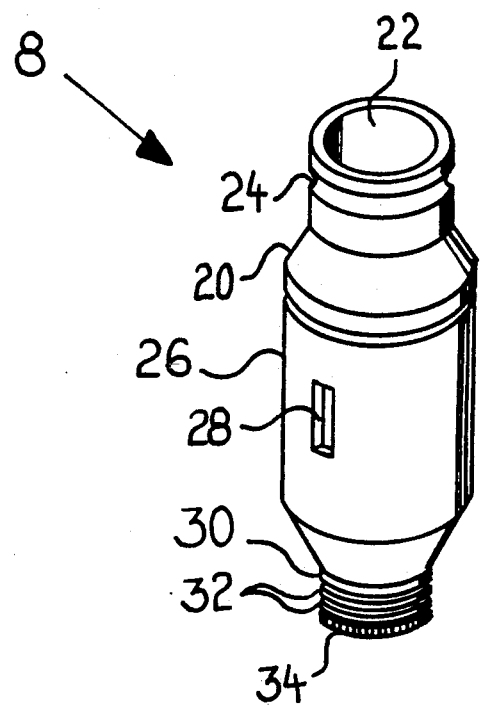
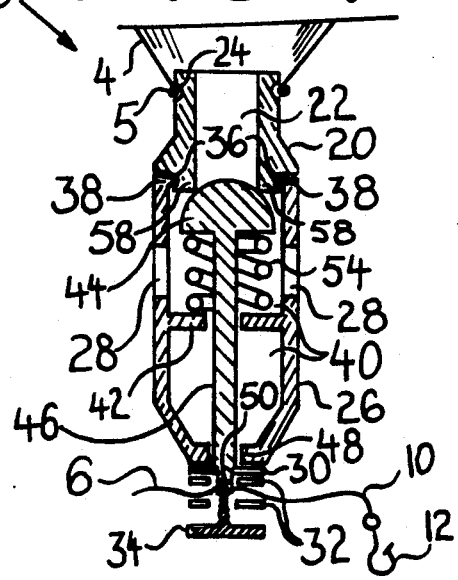
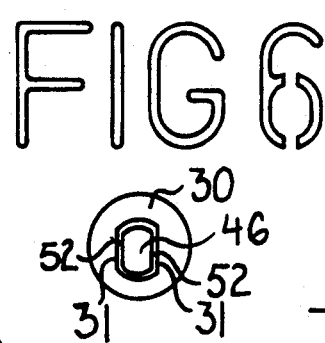
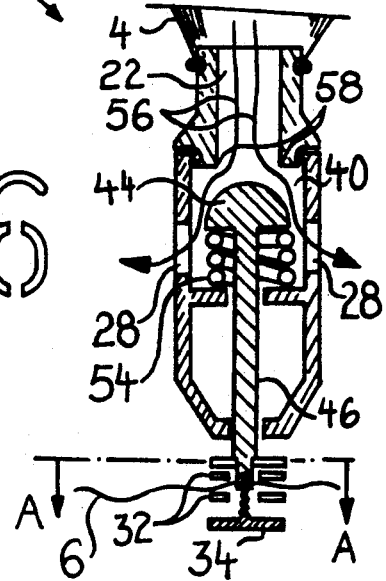

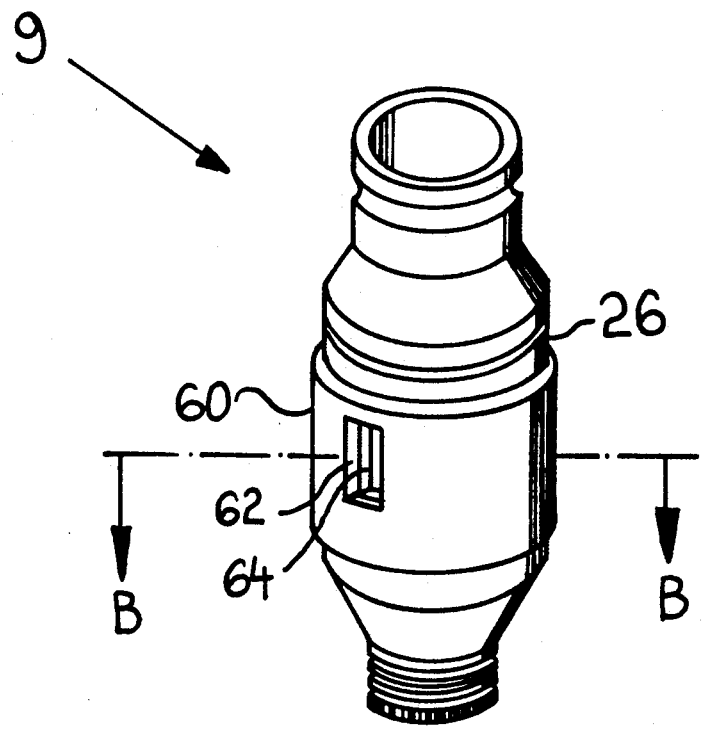
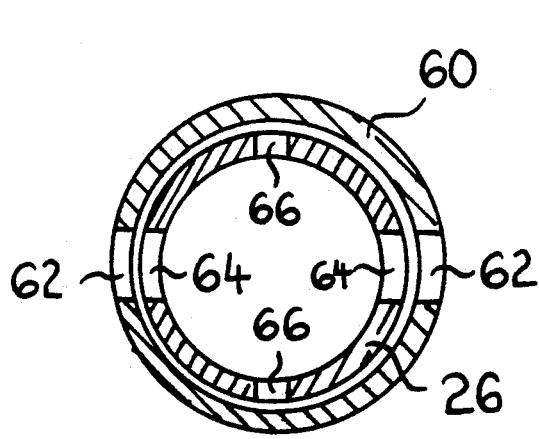
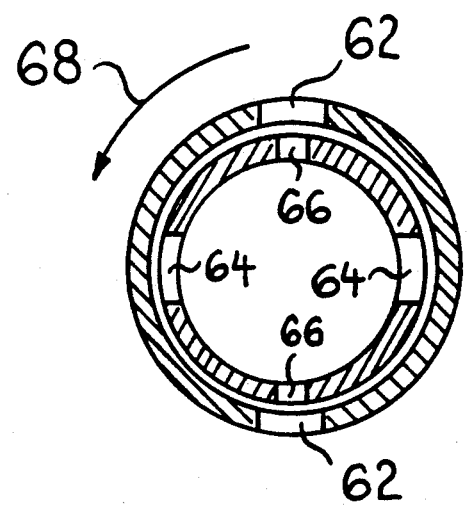

VALVED BALLOON FISHING SYSTEM

BACKGROUND OF THE INVENTION

1. Field of the Invention

The instant invention relates to fishing apparatus and in particular to a valved balloon fishing system.

2. Background of the Invention

Ever since man discovered that fish could be caught and eaten he has strived to develop better and more efficient methods to catch fish.

The fishing rod was invented as a means to cast the hook further out into the water so as to be able to attract bigger fish. The reel was added to the fishing rod as an improved fishing line handling device. Today, the combination of fishing rod and reel is the most common and widespread fishing apparatus in the world.

The fishing rod and reel combination suffers from a number of disadvantages.

One disadvantage is the distance the fisherman may cast the hook and sinker is limited by the strength and skill of the fisherman. Even the strongest and most skilled fisherman is incapable of casting the hook and sinker more than a few hundred feet.

Another disadvantage is that the hook depth (that is, the distance between the float and the hook) is generally limited to the length of the rod, due to casting difficulty when using a greater length. This becomes a significant drawback when the larger fish are located at a depth greater than the length of the rod.

Still another problem is that traditionally cast floats merely float in the water without any motion which would translate down the line to the hook to entice fish.

Another problem is that most floats are small and hard to see, especially at a distance, making it difficult to discern when a fish has struck the hook.

Another problem associated with cast fishing is the amount of work involved: the hook is cast, allowed to settle, and then reeled in so as to give the bait an "alive" look to trick fish into biting the hook. Once the hook is reeled in, the process is repeated. If the float is left floating in the water after the cast, the fisherman frequently spends his time carefully watching the float so, when it dips, he knows there's a fish nibbling on his bait. At the correct moment, he jerks on the fishing pole to firmly seat the hook in the fish's mouth, and then (hopefully) reels in the fish.

Still another problem is that sometimes a fish will feel the buoyancy of the float and (suspecting this is some kind of trap) spit out the hook and escape.

A number of different approaches have been tried to overcome the above six problems.

U.S. Pat. No. 2,531,418 was granted Fitzharris for a Jet Casting Arrow. The idea was to use a bow to propel an arrow containing a hook, sinker and float in its head. Using a bow, the fisherman would shoot the Jet Casting Arrow out over the water. Hopefully the arrow head would deploy the hook, float and sinker upon landing in the water, thereby placing the hook at a greater distance from the fisherman than had the hook been cast in the conventional method.

The distance the hook might be carried by the arrow is still limited by the strength and skill of the fisherman/archer. While the hook might be deployed at varying depths using the Jet Casting Arrow, the other four problems above remain unaddressed.

Waldmann was granted U.S. Pat. No. 3,358,399 for a Kite With Rod and Tackle Combination. A kite could be reeled out with a fishing line carried out by the kite. This method suffered from the drawback that without enough wind, the kite wouldn't fly. In addition, should the wind die down while the kite was flying, the kite would sink down to the water. Kites laying in water are difficult if not impossible to reel in without damaging the kite.

SUMMARY OF THE INVENTION

Accordingly, it is an object of this invention to provide a valved balloon fishing system capable of carrying a hook a great distance from the fisherman. The invention feature enabling this object to be accomplished is a wind driven balloon from which hook and sinker depend. Advantages associated with the accomplishment of this object include getting the hook out to where the fish are, catching larger fish and getting the hook out past the area where other fishermen have their hooks.

Another object of this invention is to provide a valved balloon fishing system capable of deploying the hook at virtually any depth. The feature of the instant invention permitting variable hook depth is a slidable attachment between the fishing line and the balloon. Advantages associated with the accomplishment of this object include placing the hook down where the big fish are, placing the hook where schools of a certain fish may be located, etc.

Still a further object of this invention is to provide a valved balloon fishing system which will impart motion to the bait on the hook. The design feature allowing this to happen is the suspension of the hook from a balloon floating on the surface of the water. In the presence of wind, the tethered floating balloon will tend to describe circular and figure-8 patterns on the surface of the water, dragging the submerged hook in its wake. The advantage of mobile bait is the fish thinks the bait is alive and tends to strike the bait more readily, thereby allowing the balloon fisherman to catch more fish.

Another object of this invention is to provide a valved balloon fishing system which incorporates a highly visible float. The design feature which allows this is the use of a valved balloon floating on the surface of the water as the float. When a fish takes the hook the valve is opened, deflating the balloon. Advantages associated with a highly visible float include reduced fisherman workload, easier assessment of the system condition from a distance, and easy detection when a fish strikes because the balloon will deflate.

Still a further object of this invention is to provide a valved balloon fishing system which involves little fisherman work to operate. Work-reducing design features include a wind-driven valved balloon which deflates when a fish takes the hook and which moves across the surface of the water by itself in the presence of wind, and a whistle mounted on the valve which sounds when the balloon deflates, thereby alerting the fisherman (possibly even him waking up) to the fact that it's time to reel in his fish. In practice, the fisherman allows the wind to drive the balloon with fishing line attached to the correct location, allows the tethered balloon motion to attract a fish which takes the hook which sounds the whistle, and then reels in the fish. Advantages of low workload fishing include the ability to read, nap, converse, etc. while fishing, as well as the avoidance of strained eyes from carefully watching a small float for signs of a fish strike.

Another object of this invention is to provide a valved balloon fishing system wherein the float loses its positive buoyancy in the presence of a fish striking the hook. Design features allowing this buoyancy loss include a balloon whose inlet is attached to a valve which opens when a fish strikes the hook, thereby deflating the balloon. An advantage associated with the accomplishment of this object is preventing the fish from becoming suspicious and spitting out the hook, thereby increasing the balloon fisherman's catch rate.

Still another object of this invention is to provide a valved balloon fishing system which is manufactured of readily available materials so as to render the valved balloon fishing system easily affordable to the average consumer.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contain FIGS. 1 and 2. Sheet 2 contains FIGS. 3, 4, 5 and 6. Sheet three contains FIGS. 7, 8 and 9. Sheet four contains FIGS. 10, 11, 12 and 13. Sheet five contains FIGS. 14 and 15.

FIG. 3 is a front isometric view of the valve.

FIG. 4 is a cross sectional view of a closed valve.

FIG. 5 is a cross sectional view of an open valve.

FIG. 6 is a cross sectional view of the anti-rotation washer and valve shaft taken at section A—A of FIG. 5.

FIG. 7 is a front isometric view of a valve with outer ring.

FIG. 8 is a cross sectional view of the valve depicted in FIG. 7 taken at section B—B of FIG. 7.

FIG. 9 is a cross sectional view of the valve depicted in FIG. 7 taken at section B—B of FIG. 7.

Figure 1:
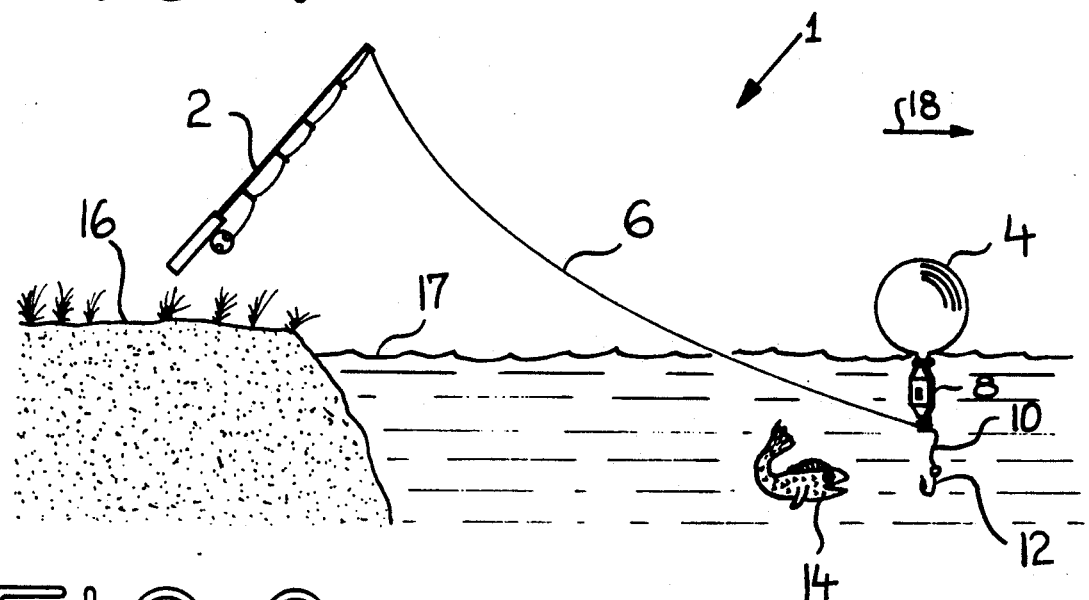
FIG. 1 is a side view of the valved balloon fishing system set up and ready to catch fish.

DRAWING ITEM INDEX 1 valved balloon fishing system
2 pole
4 balloon
6 rod line
8 valve
9 variable air escape valve
10 hook line
12 hook
14 fish
16 land
17 water
18 wind direction arrow
20 upper valve body
22 upper valve body bore
24 upper valve body balloon groove
26 lower valve body
28 lower valve body slot
30 anti-rotation washer
31 anti-rotation washer flats
32 washer
34 thumb bolt
36 upper valve body snap groove
38 lower valve body snap lip
40 lower valve body bore
42 lower valve body spring lip
44 valve ball
46 valve shaft
48 lower valve body shaft bore
50 valve shaft threaded bore
52 valve shaft flats
54 spring
56 air path arrow
58 ball seat
60 outer ring
62 outer ring slot
64 lower valve body large slot
66 lower valve body small slot
68 rotation arrow
70 grooved anti-rotation washer
72 thumb nut
76 valve shaft male thread
77 notched valve shaft
78 valve shaft groove
80 grooved anti-rotation washer groove
82 light tube support cage
84 light tube
85 whistle
86 ball cage
88 ball
90 light tube support cage bore

DETAILED DESCRIPTION OF THE PREFERRED EMBODIMENT

Referring now to FIG. 1 we can observe valved balloon fishing system 1 deployed and ready to catch fish.

The fisherman holding pole 2 may be disposed on land 16. Rod line 6 connects pole 2 with valve 8; hook line 10 attaches valve 8 to hook 12.

Balloon 4 is attached to valve 8, and, while inflated, prevents valve 8 from sinking. Wind blowing as indicated by wind direction arrow 18 pushes balloon 4 (along with valve 8, hook line 10 and hook 12) away from land 16 out on water 17.

Note that the lengths of rod line 6 and hook line 10 may be greatly varied in order to position hook 12 far enough from shore and deep enough where the fish are.

Fish 14 is hungrily eyeing hook 12.

Figure 2:
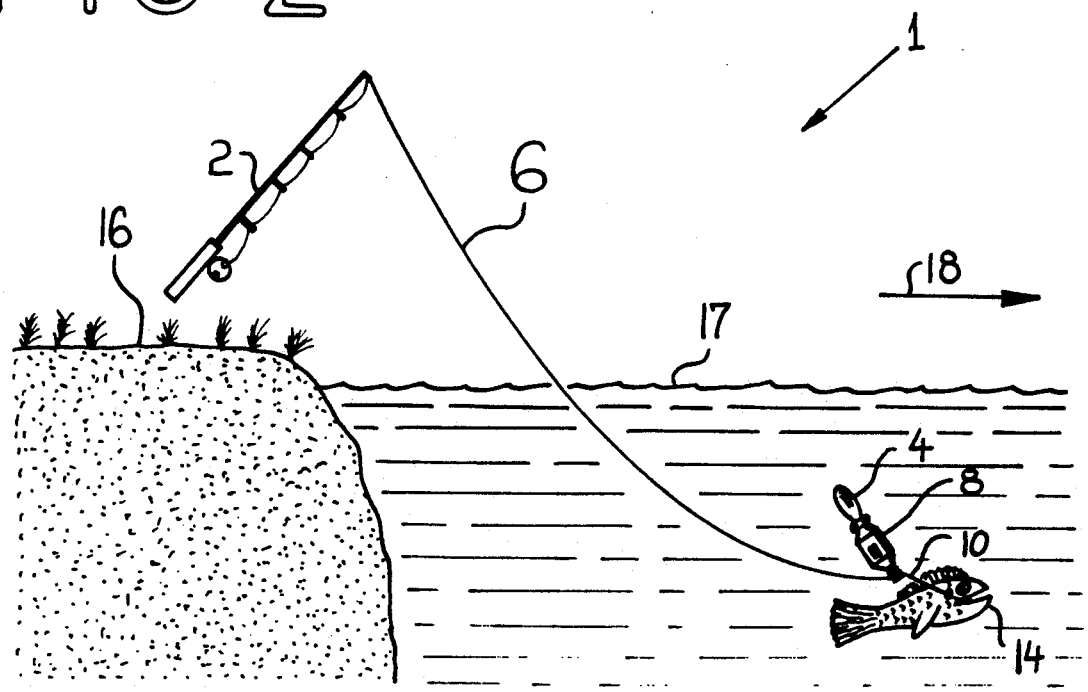
FIG. 2 is a side view of the valved balloon fishing system after a fish has taken the bait, thereby deflating the balloon.

In FIG. 2 fish 14 has taken the bait. When fish 14 tugs on hook line 10, valve 8 opens, thereby deflating balloon 4. Valve 8 may be constructed so that fish 14 feels little resistance when taking hook 12, thereby closely simulating the "feel" of taking food not attached to a hook and line. This dramatically increases the chances that fish 14 will firmly hook himself and not spit out the hook due to the feeling that something is wrong because of hook and line resistance inherent in currently available rod and reel equipment.

FIG. 3 is a front isometric view of valve 8.

Upper valve body 20 has axial upper valve body bore 22 and upper valve body balloon groove 24. Lower valve body 26 has lower valve body slot 28.

FIG. 4 is a cross sectional view of valve 8 in the closed position.

Balloon 4 is attached to valve upper body 20 by virtue of balloon lip 5 being elastically urged into upper valve body balloon groove 24.

Upper valve body 20 is attached to lower valve body 26 because lower valve body snap lip 38 is elastically urged into upper valve body snap groove 36.

Valve ball 44 is rigidly attached to valve shaft 46. Spring 54, seated on lower valve body spring lip 42, urges valve ball 44 into airtight contact with ball seat 58. Valve ball 44, valve shaft 46, spring 54 and lower valve body spring lip 42 are disposed within lower valve body bore 40.

Valve shaft 46 freely slides through lower valve body shaft bore 48 disposed at the end of lower valve body 26 opposite upper valve body 20.

Valve shaft 46 has valve shaft threaded bore 50 at the extreme of valve shaft 46 opposite valve ball 44.

Thumb bolt 34 is sized to thread into valve shaft threaded bore 50, and constrains anti-rotation washer 30 and washers 32 on valve shaft 46.

Rod line 6 passes between washers 32, thereafter becoming hook line 10 to which hook 12 is attached.

FIG. 5 is a cross sectional view of valve 8 in the open position.

When a fish takes hook 12, he pulls on hook line 10 which is attached to valve shaft 46, overcoming the spring force of spring 54 and unseating valve ball 44 from ball seat 58. Air contained in balloon 4 is free to escape through upper valve body bore 22, lower valve body bore 40 and out through lower valve body slots 28 as indicated by air path arrows 56.

Note the size of spring 54 installed in valve 8 may be varied so as to provide the appropriate response to the particular type of fish being pursued.

FIG. 6 is a cross sectional view taken at section A—A of FIG. 6 of the way anti-rotation washer 30 fits over valve shaft 46. As is illustrated in FIG. 6, anti-rotation washer 30 has anti-rotation washer flats 31 which nest over valve shaft flats 52, thereby rotationally immobilizing anti-rotation washer 30 relative to valve shaft 46.

Rod line 6 is attached to valve shaft 46 by placing rod line 6 between washers 32, grasping anti-rotation washer 30 with one hand, and tightening thumb bolt 34 into valve shaft threaded bore 50 with the other hand, thereby frictionally holding rod line 6 between washers 32.

FIGS. 7 through 9 depict an alternate embodiment of valve 8, variable air escape valve 9, wherein outer ring 60 is rotatably attached to the outside of lower valve body 26.

FIG. 7 is a front isometric view of variable air escape valve 9.

FIG. 8 is a cross sectional view of variable air escape valve 9 taken at section B—B of FIG. 7 showing variable air escape valve 9 in the maximum air flow position. Outer ring 60 having outer ring slots 62 is rotatably disposed relative to lower valve body 26 such that outer ring slots 62 are aligned with lower valve body large slots 64.

FIG. 9 is a cross sectional view of variable air escape valve 9 taken at section B—B of FIG. 7 showing variable air escape valve 9 in the reduced air flow position. Outer ring 60 having outer ring slots 62 has been rotated relative to lower valve body 26 as indicated by rotation arrow 68 so that outer ring slots 62 are aligned with lower valve body small slots 66.

Figure 10:
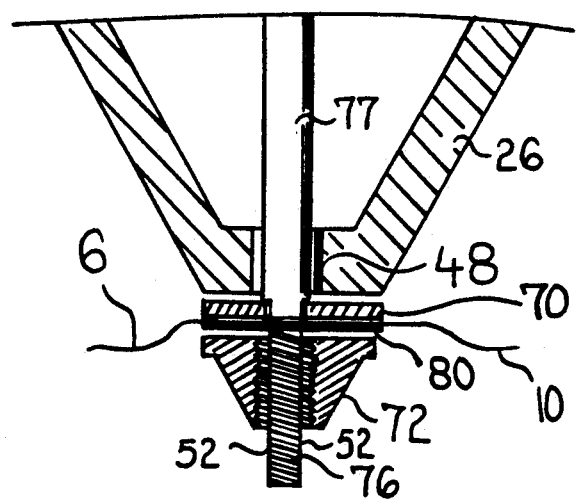
FIG. 10 is a front cross sectional view of an alternate means of attaching fishing line to a valve.

FIG. 10 is a front cross sectional view of an alternate way of attaching rod line 6 to notched valve shaft 77.

Figure 14:
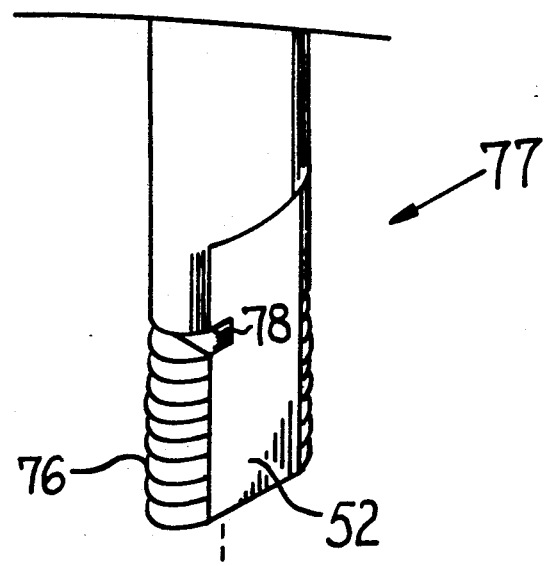
FIG. 14 is a side isometric view of the notched valve shaft depicted in FIGS. 10 and 11.

FIG. 14 is a side isometric view of notched valve shaft 77 having valve shaft male thread 76 and valve shaft groove 78.

Figure 15:
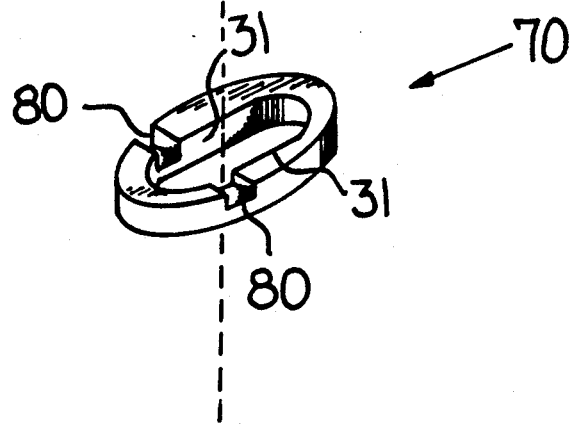
FIG. 15 is a side isometric view of the grooved anti-rotation washer depicted in FIGS. 10 and 11.

FIG. 15 is a side isometric view of grooved anti-rotation washer 70 having grooved anti-rotation washer groove 80.

FIG. 10 shows grooved anti-rotation washer 70 held on notched valve shaft 77 by means of thumb nut 72. Thumb nut 72 is sized to fit valve shaft male thread 76.

Figure 11:
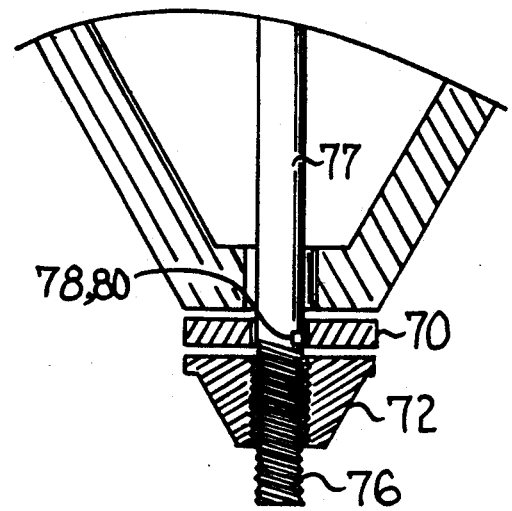
FIG. 11 is a side cross sectional view of the detail depicted in FIG. 10.

FIG. 11 is a side cross sectional view of valve shaft groove 78 aligned with grooved anti-rotation washer groove 80 such that rod line 6 may be introduced through grooved anti-rotation washer groove 80 and valve shaft groove 78, and then thumb nut 72 may be tightened onto valve shaft male thread 76, thereby attaching rod line 6 to notched valve shaft 77.

Figure 12:
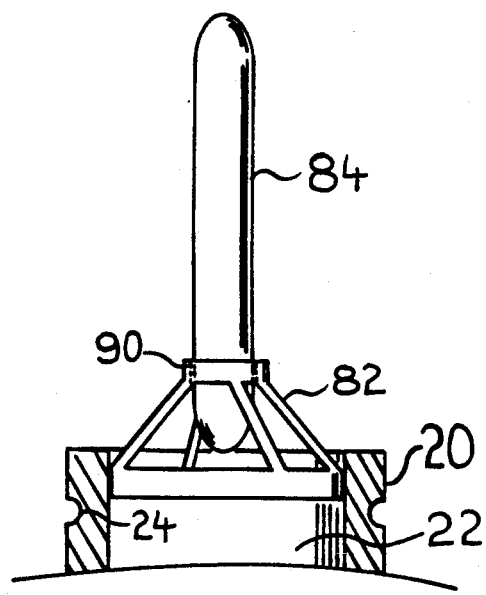
FIG. 12 is a cross sectional view of an alternate embodiment of the valve incorporating a light stick.

FIG. 12 depicts an alternate embodiment of valved balloon fishing system 1 wherein light tube support cage 82 has been frictionally inserted into upper valve body bore 22. Light tube 84 has been frictionally inserted into light tube support tube cage bore 90. Light tube 84 is a readily available light tube of the type which, when an internal reservoir is broken, allows chemicals to mix, thereby producing light. Alternately, light tube 84 may be any of a variety of commercially available light tubes which may produce light upon being frozen, are powered by batteries, etc..

The embodiment depicted in FIG. 12 allows the night fisherman to easily assess the condition of the valved balloon fishing system 1 from a distance.

Figure 13:
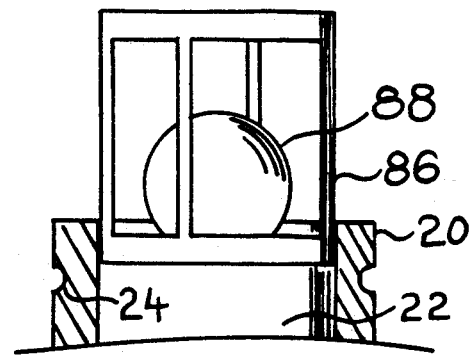
FIG. 13 is a cross sectional view of an alternate embodiment of the valve incorporating a whistle.

FIG. 13 is a cross sectional view of an alternate embodiment of valved balloon fishing system 1 wherein a ball 88 contained in a ball cage 86 comprises a whistle 85 which is frictionally installed in upper valve body bore 22. The whistle sounds when valve 8 is opened and air escapes from balloon 4, thereby providing the fisherman a loud audio signal that a fish has taken the hook.

All components of valved balloon fishing system 1 may be manufactured of plastic, nylon, rubber, commercially available fasteners and hardware, or other appropriate materials. Pole 2, rod line 6, hook line 10 and hook 12 are conventional pieces of fishing equipment. Balloon 4 may be a standard party balloon or other appropriate balloon.

OPERATION

Frictionally insert optional light stick 84 or optional whistle 85 into upper valve body bore 22. Install a balloon 4 on upper valve body 20 by sliding balloon lip 5 into upper valve body balloon groove 24.

Inflate balloon 4 by manually holding valve 8 open by pulling on valve shaft 46 so as to unseat valve ball 44 from ball seat 58, then blow into one lower valve body slot 28 while covering the other lower valve body slot 28 with a finger.

After the balloon is inflated as desired, release valve shaft 46 to allow valve ball 44 to seat in ball seat 58, thereby maintaining balloon 4 inflated.

Attach valve shaft 46 to hook line 10 so as to set the length of hook line 10 as desired by positioning hook line 10 between washers 32, holding anti-rotation washer 30 with one hand, and tightening thumb bolt 34.

In the alternate embodiment hook line attachment scheme depicted in FIGS. 10, 11, 14 and 15, hook line 10 would be placed in grooved anti-rotation washer groove 80 and valve shaft groove 78. Grooved anti-rotation washer 70 would be grasped with one hand and thumb nut 72 tightened with the other hand.

Allow the wind to blow balloon 4 to the desired location.

When fish 14 takes the hook, balloon 4 will deflate, providing a clear visual signal a fish is on the line. In the alternate embodiments, the light provided by light stick 84 will disappear due to the submergence of light stick 84 or whistle 85 will sound loudly.

Reel in the fish.

While a preferred embodiment of the invention has been illustrated herein, it is to be understood that changes and variations may be made by those skilled in the art without departing from the spirit and scope of the appending claims.

I claim:

1. A valved balloon fishing system comprising:
   a balloon,
   a valve attached to said balloon, said valve comprising a valve actuation means,
   a hook line attached to said valve actuation means whereby a fish pulling on said hook line may deflate said balloon,
   a rod line attached to said valve,
   said valve comprising:
      an upper valve body having an upper valve body bore, one end of said upper valve body being attached to said balloon, the end of said upper valve body opposite said balloon terminating in a ball seat,
      a lower valve body attached to said upper valve body, said lower valve body having a lower valve body bore which communicates with said upper valve body bore, said lower valve body also having lower valve body slots wherethrough air contained in said lower valve body bore may escape to the exterior of said lower valve body;
      a valve ball within said lower valve body bore,
      said valve actuation means comprising a valve shaft, one end of which is rigidly attached to said valve ball and the other end of which extends through the end of said lower valve body opposite said upper valve body, and
      a spring which urges said valve ball into intimate contact with said ball seat.

2. The valved balloon fishing system of claim 1 wherein said balloon has a balloon lip at its aperture, and said upper valve body has an upper valve body balloon lip groove sized to accommodate said balloon lip, thereby allowing said balloon to be firmly attached to said upper valve body.

3. The valved balloon fishing system of claim 2 wherein the end of said valve shaft opposite said valve ball exits said lower valve body bore through a lower valve body shaft bore disposed at the end of said lower valve body bore opposite said upper valve body, the end of said valve shaft opposite said valve ball further comprising:
   parallel valve shaft flats, and
   a valve shaft threaded bore.

4. The valved balloon fishing system of claim 3 further comprising:
   an anti-rotation washer having anti-rotation washer flats on its inside diameter, said anti-rotation washer being sized to admit passage to said valve shaft, each said anti-rotation washer flat being in close proximity to one said valve shaft flat when said anti-rotation washer is installed on said valve shaft, thereby rendering said anti-rotation washer non-rotatable with respect to said valve shaft,
   a plurality of washers installed on said valve shaft under said anti-rotation washer, and
   a thumb bolt threaded into said valve shaft threaded bore whereby said washers may be tightened against said anti-rotation washer.

5. The valved balloon fishing system of claim 4 wherein said hook line and said said rod line are disposed between said washers and attached to said valve shaft by virtue of said thumb bolt being tightened into said valve shaft threaded bore, thereby compressing said washers between said thumb bolt and said anti-rotation washer.

6. The valved balloon fishing system of claim 5 further comprising:
   a hook attached to the end of said hook line opposite the end of said hook line attached to said valve shaft, and
   a fishing pole and reel attached to the end of said rod line opposite the end of said rod line attached to said valve shaft.

7. The valved balloon fishing system of claim 1 wherein said lower valve body slots are comprised of a pair of diametrically opposed lower valve body small slots and a pair of lower valve body large slots, the diameter joining said pair of lower valve body small slots being coplaner with and perpendicular to the diameter joining said lower valve body large slots.

8. The valved balloon fishing system of claim 7 further comprising an outer ring rotatably attached to said lower valve body, said outer ring comprising a pair of diametrically opposed outer ring slots the same size as said lower valve body large slots, said outer ring slots being located on said outer ring so as to line up either with said diametrically opposed lower valve body small slots or said lower valve body large slots, thereby changing the air flow through the valve.

9. The valved balloon fishing system of claim 1 wherein a light tube support cage is frictionally installed in the end of said upper valve body bore at the end of said upper valve body where said balloon is attached, said light tube support cage having a light tube support cage bore and a light tube frictionally installed in said light tube support cage bore.

10. The valved balloon fishing system of claim 1, wherein a whistle is frictionally installed in said upper valve body bore at the end of said upper valve body to which said balloon is attached.

11. The valved balloon fishing system of claim 10 wherein said whistle is comprised of a ball cage and a ball contained in said ball cage.

12. The valved balloon fishing system of claim 1 wherein said valve shaft is a notched valve shaft having a valve shaft groove at its end opposite end valve ball and whose end opposite said valve ball terminates in a valve shaft male thread and a pair of parallel valve shaft flats.

13. The valved balloon fishing system of claim 12 further comprising:
   a grooved anti-rotation washer having a groove which may be aligned with said valve shaft groove, and anti-rotation washer flats on its inside diameter, said notched valve shaft being disposed within said grooved anti-rotation washer with said valve shaft flats being in close proximity with said grooved anti-rotation washer flats, and a thumb nut sized to thread onto said valve shaft male thread whereby a fishing line may be threaded through and constrained within said grooved anti-rotation washer groove and said valve shaft groove by tightening said thumb nut onto said valve shaft male thread.

14. A valved balloon fishing system comprising:
a balloon,
a valve attached to said balloon, said valve comprising a valve actuation means,
a hook line attached to said valve actuation means whereby a fish pulling on said hook line may deflate said balloon by operating said valve actuation means, and
a rod line attached to said valve.

* * * * *